United States Patent
Suzuki

(10) Patent No.: US 9,648,336 B2
(45) Date of Patent: May 9, 2017

(54) ENCODING APPARATUS AND METHOD

(71) Applicant: CANON KABUSHIKI KAISHA, Tokyo (JP)

(72) Inventor: Ryota Suzuki, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 514 days.

(21) Appl. No.: 14/265,819

(22) Filed: Apr. 30, 2014

(65) Prior Publication Data

US 2014/0328383 A1    Nov. 6, 2014

(30) Foreign Application Priority Data

May 2, 2013 (JP) ................................ 2013-097116

(51) Int. Cl.
*H04N 19/31* (2014.01)
*H04N 19/34* (2014.01)

(52) U.S. Cl.
CPC ............. *H04N 19/31* (2014.11); *H04N 19/34* (2014.11)

(58) Field of Classification Search
CPC ........ H04N 19/30; H04N 19/31; H04N 19/34; H04N 19/36
USPC ........................................ 375/240.01–240.29
See application file for complete search history.

(56) References Cited

U.S. PATENT DOCUMENTS

| 7,158,570 | B2 * | 1/2007 | Nagumo | H04N 19/105 |
|---|---|---|---|---|
| | | | | 375/240.16 |
| 2003/0007562 | A1 * | 1/2003 | Kerofsky | H04N 21/234327 |
| | | | | 375/240.12 |
| 2003/0118096 | A1 * | 6/2003 | Ishtiaq | H04N 19/503 |
| | | | | 375/240.1 |
| 2004/0028131 | A1 * | 2/2004 | Ye | H04N 19/147 |
| | | | | 375/240.11 |
| 2007/0073779 | A1 * | 3/2007 | Walker | H04N 21/23439 |
| 2007/0110150 | A1 | 5/2007 | Wang et al. | |
| 2007/0183494 | A1 * | 8/2007 | Hannuksela | H04N 21/234327 |
| | | | | 375/240.1 |
| 2011/0043608 | A1 * | 2/2011 | Chen | H04N 19/597 |
| | | | | 348/43 |
| 2013/0208792 | A1 * | 8/2013 | He | H04N 19/00569 |
| | | | | 375/240.12 |

FOREIGN PATENT DOCUMENTS

| JP | 2011-223626 A | 11/2011 |
|---|---|---|
| WO | 2007/042916 A1 | 4/2007 |

* cited by examiner

*Primary Examiner* — Nathnael Aynalem
(74) *Attorney, Agent, or Firm* — Cowan, Liebowitz & Latman, P.C.

(57) ABSTRACT

An encoding unit encodes moving image data so that it has a temporal hierarchical structure in which a frame rate in a case of decoding up to a layer that is one above a predetermined layer is higher than a frame rate in a case of decoding up to the predetermined layer. A first acquisition unit acquires a frame rate of encoded first moving image data. A second acquisition unit acquires second moving image data targeted for encoding and a recording frame rate that is designated by a user operation. The encoding unit encodes the second moving image data so that it has a temporal hierarchical structure including a layer corresponding to the frame rate of the first moving image data and a layer corresponding to the recording frame rate.

10 Claims, 7 Drawing Sheets

FIG. 7

TEMPORAL LAYER COMPATIBILITY INFORMATION SYNTAX

| layer_information(){ | Descriptor |
|---|---|
| num_layer_minus1 | u(3) |
| for(1=0; i<=num_layer_minus1; i++){ | |
| frame_rate_id[i] | u(16) |
| } | |
| } | |

· num_layer_minus1 : NUMBER OF TEMPORAL LAYERS

· frame_rate_id : FRAME RATE FOR EACH TEMPORAL LAYER

· u(n)  :unsigned integer n bits

FIG. 8

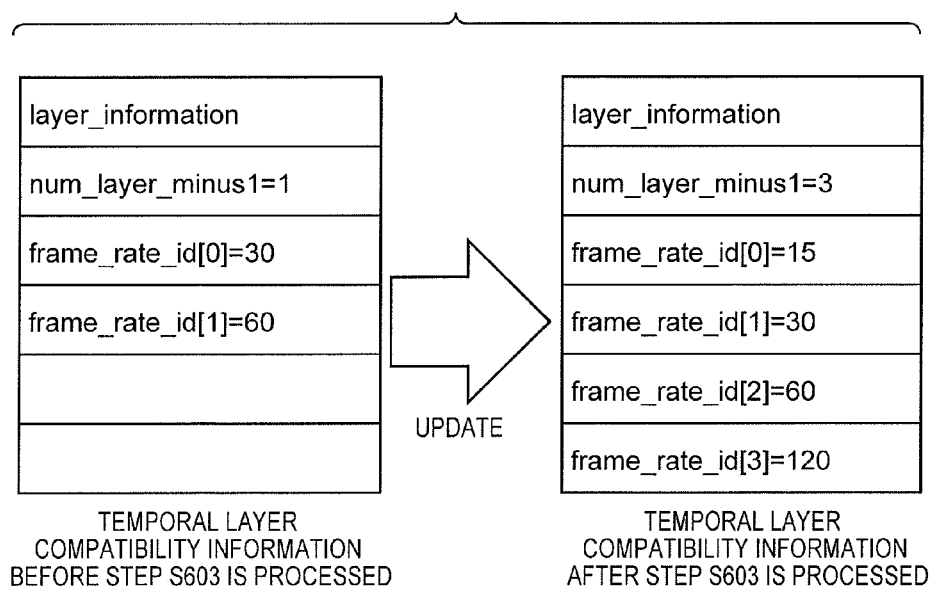

TEMPORAL LAYER COMPATIBILITY INFORMATION BEFORE STEP S603 IS PROCESSED

| layer_information |
| --- |
| num_layer_minus1=1 |
| frame_rate_id[0]=30 |
| frame_rate_id[1]=60 |

UPDATE

TEMPORAL LAYER COMPATIBILITY INFORMATION AFTER STEP S603 IS PROCESSED

| layer_information |
| --- |
| num_layer_minus1=3 |
| frame_rate_id[0]=15 |
| frame_rate_id[1]=30 |
| frame_rate_id[2]=60 |
| frame_rate_id[3]=120 |

ENCODING APPARATUS AND METHOD

BACKGROUND

Field of the Invention

The present invention relates to an apparatus and a method for encoding image data.

Description of the Related Art

Conventionally known image processing apparatuses that are able to edit encoded moving image data include, for example, a computer in which an image editing program is installed, a dedicated moving image editing device, an image capture apparatus, and a portable communication apparatus in which an image editing program is installed. These image processing apparatuses are able to perform editing such as combining a plurality of encoded moving image data, for example. In a case of combining two encoded moving image data having different frame rates, the frame rates need to be matched after decoding these two encoded moving image data. Available methods of bringing the frame rates into alignment include decimating frames or combining a frame image, for example.

In recent years, a technology for hierarchically encoding moving image data in relation to frame rate has been proposed as a moving image encoding technology (temporal hierarchical encoding). This technology is known as so-called "SVC (Scalable Video Coding)", and is proposed as an extension of H.264/AVC.

For example, Japanese Patent Laid-Open No. 2011-223626 discloses a technology for distributing only data corresponding to a temporal layer suitable for distribution, in a case of streaming distribution of moving image data that has been encoded by temporal hierarchical encoding.

However, there is a problem in that decoding, frame rate conversion and re-encoding must be performed when combining two encoded moving image data having different frame rates using a conventional method, thus taking processing time and increasing operational load.

SUMMARY

According to an aspect of the present invention, a new apparatus and new method for generating encoded moving image data will be given. For example, a new apparatus and new method for generating encoded moving image data with a low processing load when combining two encoded moving image data having different frame rates will be given.

According to an aspect of the present invention, there is provided an encoding apparatus comprising: an encoding unit that encodes moving image data so that it has a temporal hierarchical structure in which a frame rate in a case of decoding up to a layer that is one above a predetermined layer is higher than a frame rate in a case of decoding up to the predetermined layer; a first acquisition unit that acquires a frame rate of encoded first moving image data; and a second acquisition unit that acquires second moving image data targeted for encoding and a recording frame rate that is designated by a user operation, wherein the encoding unit encodes the second moving image data so that it has a temporal hierarchical structure including a layer corresponding to the frame rate of the first moving image data and a layer corresponding to the recording frame rate.

According to another aspect of the present invention, there is provided a method comprising: encoding moving image data so that it has a temporal hierarchical structure in which a frame rate in a case of decoding up to a layer that is one above a predetermined layer is higher than a frame rate in a case of decoding up to the predetermined layer; acquiring a frame rate of encoded first moving image data; acquiring second moving image data targeted for encoding and a recording frame rate that is designated by a user operation; and encoding the second moving image data so that it has a temporal hierarchical structure including a layer corresponding to the frame rate of the first moving image data and a layer corresponding to the recording frame rate.

Further features and aspects of the present invention will become apparent from the following description of exemplary embodiments with reference to the attached drawings.

BRIEF DESCRIPTION OF THE DRAWINGS

FIG. 7 is a diagram for showing a temporal layer compatibility information syntax in the second exemplary embodiment.

FIG. 8 is a diagram for showing exemplary updating of temporal layer compatibility information in the second exemplary embodiment.

DESCRIPTION OF THE EMBODIMENTS

Exemplary embodiments, features, and aspects of the present invention will be described below with reference to the drawings. It should be noted that the technical scope of the present invention is defined by the claims, and is not limited by any of the exemplary embodiments described below. In addition, not all combinations of the features described in the exemplary embodiments are necessarily required for realizing the present invention.

Note that functional blocks that are described in the following exemplary embodiments is not necessarily executed by different hardwares. That is, some functions of the functional blocks may be executed by a single hardware, for example. Also, a function of one functional block or functions of a plurality of functional blocks may be executed by a number of hardwares. Also, a function of each functional block may be performed by a computer program expanded in memory by a CPU.

First Exemplary Embodiment

In the first exemplary embodiment, the configuration and process of an encoding apparatus 100 which is capable of acting as an image processing apparatus, an image capture apparatus, a portable communication apparatus, a computer or another apparatus will be described. Note that the applicable scope of the present invention encompasses any apparatus, such as an image processing apparatus, an image capture apparatus, a portable communication apparatus or a computer, for example.

Figure 1:
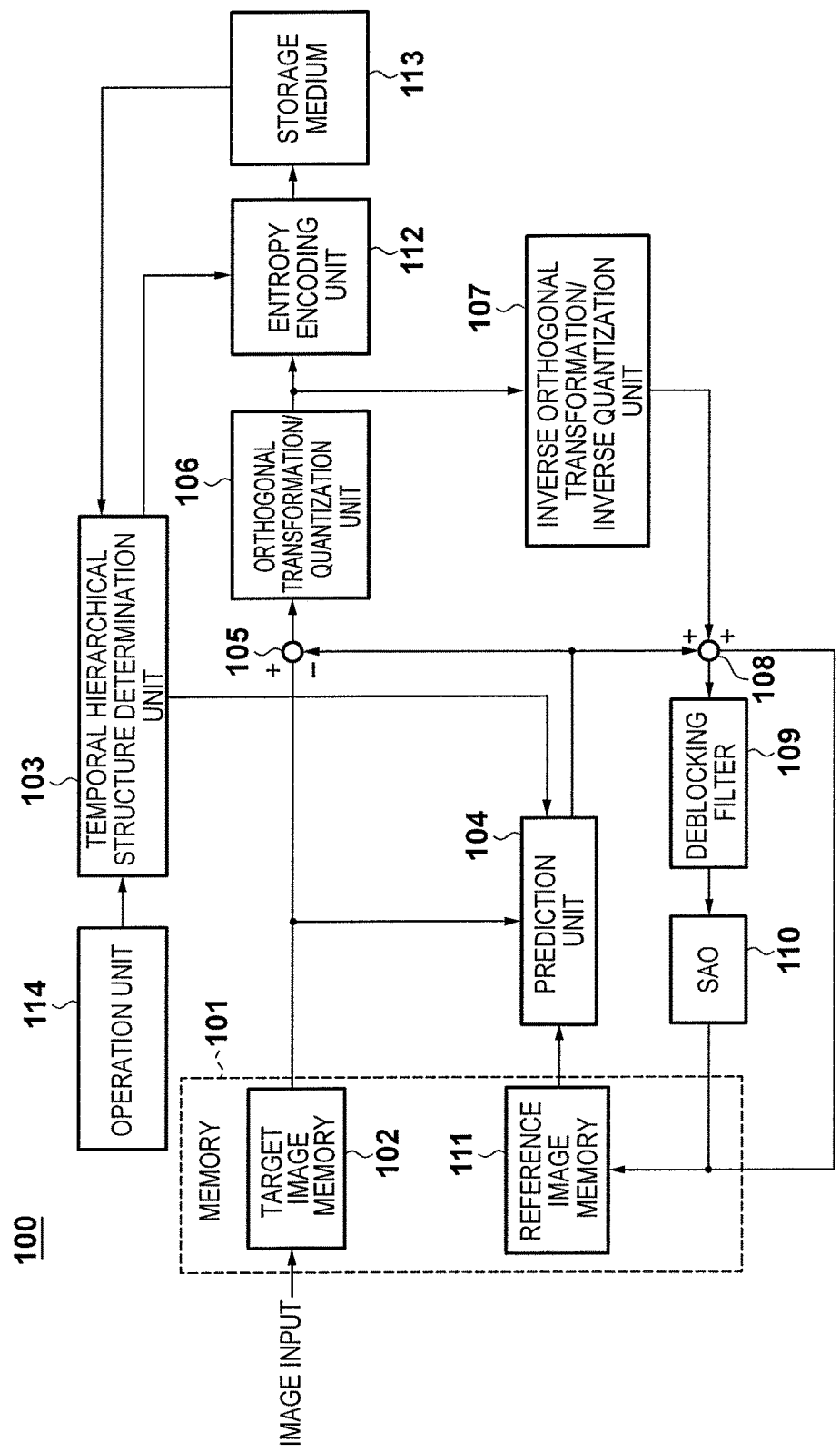
FIG. 1 is a diagram for showing functional blocks of an encoding apparatus 100 in a first exemplary embodiment.

FIG. 1 shows functional blocks of the encoding apparatus 100 in the first exemplary embodiment. The encoding apparatus 100 has an encoding function that is based on HEVC (High Efficiency Video Coding) standard. Note that although the HEVC standard is given as an example in the first exemplary embodiment, the first exemplary embodiment is also applicable to other encoding methods for performing similar encoding.

In FIG. 1, an image signal input to the encoding apparatus 100 is stored in a target image memory 102 that is included in a memory 101. A temporal hierarchical structure determination unit 103 determines a temporal hierarchical structure to be utilized when performing temporal hierarchical encoding (discussed later with reference to FIGS. 2 and 3). The temporal hierarchical structure determination unit 103 outputs information indicating the number of determined temporal layers to a prediction unit 104, and outputs an identifier (hereinafter, referred to as "temporal ID") indicating a temporal layer number corresponding to the determined temporal layer to an entropy encoding unit 112. Also, information indicating a temporal hierarchical structure of moving image data stored in a storage medium 113 is input to the temporal hierarchical structure determination unit 103. Furthermore, information indicating a recording frame rate of moving image data to be encoded is input from an operation unit 114 to the temporal hierarchical structure determination unit 103. A detailed description of temporal hierarchical structure determination process will be given later.

The prediction unit 104 determines a predictive coding method for a target block (which is a unit of encoding), and generates a predictive image. Here, encoding methods include an intra-frame predictive coding for encoding with image data within a frame, and an inter-frame predictive coding for encoding with prediction between frames. In the following exemplary embodiments, one frame corresponds to one image, for example. In a case of performing the intra-frame predictive coding, image data of the target block is read out from the target image memory 102 and input to the prediction unit 104. The prediction unit 104 reads out encoded pixel data (which is output from an adder 108 discussed later, prior to a deblocking filter 109 being applied thereto) adjacent to the target block from a reference image memory 111. The prediction unit 104 then generates a plurality of intra-frame predictive image data corresponding to prediction modes, performs block matching with the image data of the target block and a plurality of generated intra-frame predictive image data, selects one intra-frame predictive image data with the highest encoding efficiency, and outputs the selected intra-frame predictive image data to a subtractor 105. On the other hand, in a case of performing the inter-frame predictive coding, the image data of the target block is read out from the target image memory 102 and input to the prediction unit 104. Also, reference image data that has been previously encoded is read out from the reference image memory 111 and input to the prediction unit 104. The prediction unit 104 performs motion search process based on the image data of the target block and the reference image data, and detects a motion vector with respect to a reference image. The prediction unit 104 generates inter-frame predictive image data based on the detected motion vector and reference image data obtained from the reference image memory 111, and outputs the generated inter-frame predictive image data to the subtractor 105.

Figure 2:
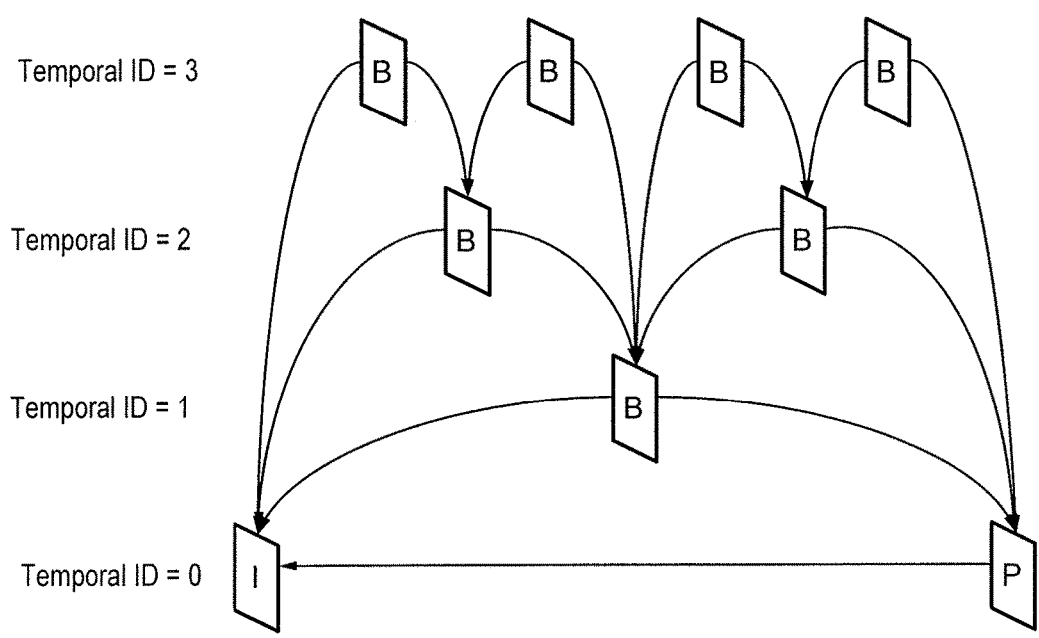
FIG. 2 is a diagram for showing an exemplary reference relationship of temporal hierarchical encoding.
Figure 3:
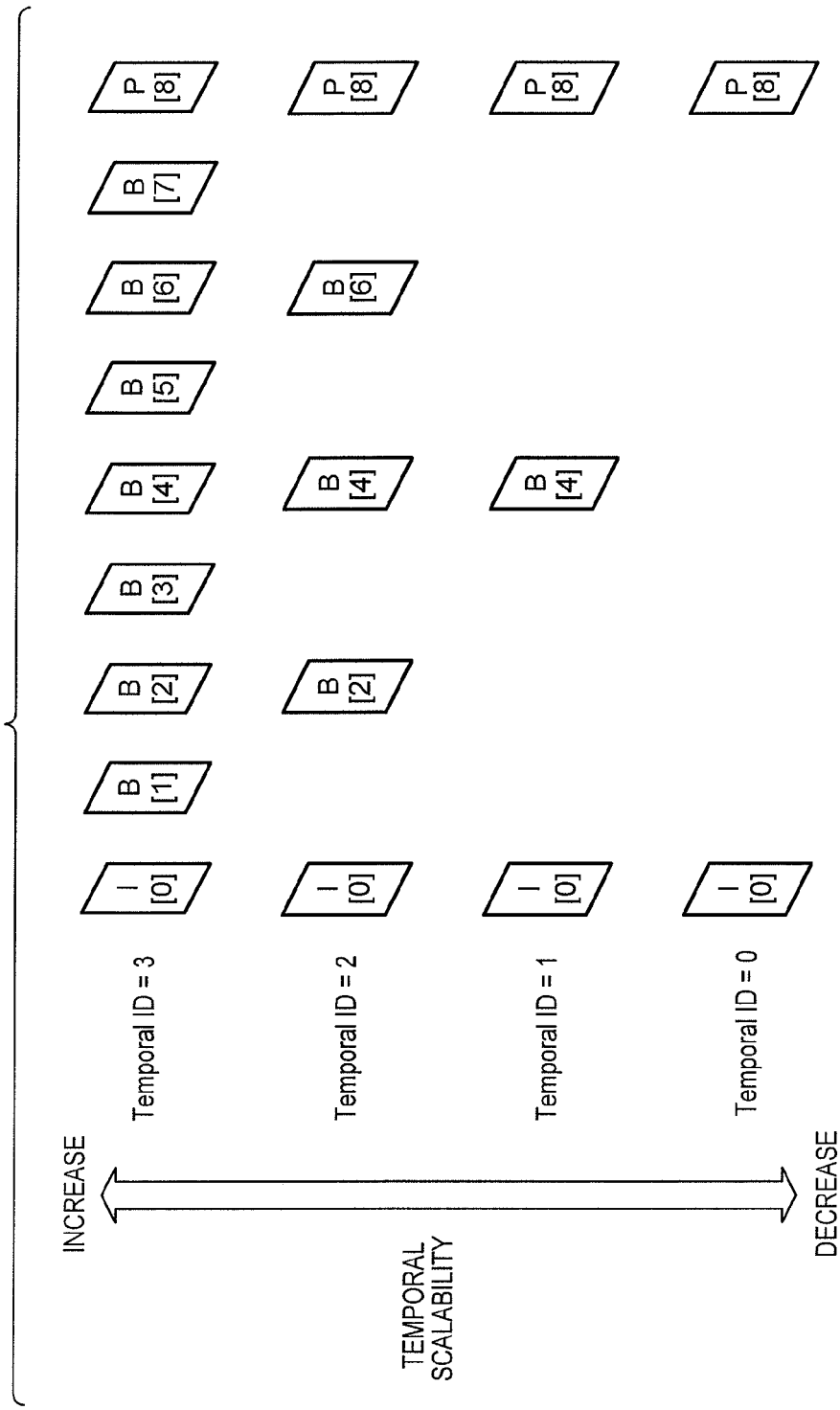
FIG. 3 is a conceptual diagram for showing frames that are obtained in a case where moving image data that has been subjected to temporal hierarchical encoding is decoded.

The prediction unit 104 determines a reference relationship between pictures, based on information indicating the number of temporal layers that is input from the temporal hierarchical structure determination unit 103. In the following exemplary embodiments, one picture corresponds to one frame, for example. An exemplary reference relationship of temporal hierarchical encoding is shown in FIG. 2. In this exemplary temporal hierarchical encoding, the reference relationship is restricted to being hierarchical, B pictures are used as reference images, and each picture does not refer to temporal layers that are higher than the layer to which the picture belongs. By restricting the reference relationship in this way, it becomes possible to reproduce moving images at four different frame rates from one encoded moving image data, as shown in FIG. 3. More specifically, as shown in FIG. 2, encoded moving image data that has been subjected to temporal hierarchical encoding includes frames to be reproduced at a predetermined frame rate in the lowest layer (temporal ID=0). In the encoded moving image data as shown in FIG. 2, a frame included between adjacent frames belonging to the lowest layer belonged to a 2nd layer (temporal ID=1) which is one above the lowest layer. Therefore, the frame between the adjacent frames belonging to the lowest layer and all frames belonging to the lowest layer are belonged to the 2nd layer. Similarly, a frame between adjacent frames belonging to the 2nd layer (temporal ID=1) and all frames belonging to the lowest layer and 2nd layer (temporal IDs=0 and 1) are belonged to a and layer (temporal ID=2). In a case of decoding encoded moving image data that has been subjected to temporal hierarchical encoding, it is possible to decode only frames belonging to the lowest layer or to decode frames belonging to layers from the lowest layer to a specific layer (e.g., temporal ID=0, 1 and 2). Of course, it is also possible to decode frames belonging to all the layers (e.g., temporal ID=0, 1, 2, and 3). Accordingly, as shown in FIG. 3, a frame rate corresponding to a layer higher than another layer is faster than a frame rate in corresponding to said another layer.

Returning to FIG. 1, the predictive image data generated by the prediction unit 104 and the image data of the target block that is read out from the target image memory 102 are input to the subtractor 105. The subtractor 105 then generates difference image data which includes difference between the image data of the target block and the predictive image, and outputs the generated difference image data to an orthogonal transformation/quantization unit 106.

The orthogonal transformation/quantization unit 106 performs orthogonal transformation on the inputted difference image data, and performs quantization process on transformation coefficients resulting from the orthogonal transformation.

The entropy encoding unit 112 performs entropy encoding to encode transformation coefficients which are quantized by the orthogonal transformation/quantization unit 106, and generates encoded data. Also, the entropy encoding unit 112 multiplexes the temporal IDs input from the temporal hierarchical structure determination unit 103 as header information to the encoded data, and outputs the header information and the encoded data to the storage medium 113. The storage medium 113 records the header information and the encoded data (which corresponds to encoded moving image data) input from the entropy encoding unit 112. Here, quantization coefficients used by the orthogonal transformation/quantization unit 106 are computed from the amount of encoded data generated by the entropy encoding unit 112, the target amount of encoded data, and the like.

The transformation coefficients quantized by the orthogonal transformation/quantization unit 106 are also input to an inverse orthogonal transformation/inverse quantization unit 107. The inverse orthogonal transformation/inverse quantization unit 107 inversely quantizes the inputted transformation coefficients, performs inverse orthogonal transformation process on transformation coefficients resulting from the inverse quantization, and generates inversely transformed data.

The inversely transformed data and the predictive image data generated by the prediction unit 104 are input to the adder 108, and added together to generate reconstructed image data. The reconstructed image data is input to the reference image memory 111 and used in generating intra-frame predictive image data.

The reconstructed image data is subjected to a process that involves applying the deblocking filter 109 to reduce block distortion that occurs at the time of encoding, and output to a SAO (sample adaptive offset) 110. The SAO 110 then reduces distortion in the reconstructed image data by adding an offset to pixel values, and stores the resultant data in the reference image memory 111 as reference image data for use at the time of inter-frame predictive coding.

In this way, the encoding apparatus 100 is able to perform temporal hierarchical encoding, based on temporal hierarchical information determined by the temporal hierarchical structure determination unit 103. The temporal hierarchical structure determination unit 103 is able to determine temporal hierarchical structure of moving image data to be subsequently encoded based on frame rates and temporal hierarchical structures of previously recorded moving image data.

Note that the encoding apparatus 100 may be further provided with an image capture unit (not shown), in which case the encoding apparatus 100 functions as an image capture apparatus. In a case where the encoding apparatus 100 functions as an image capture apparatus, an image capture unit included in the encoding apparatus 100 captures an image, generates an image signal corresponding to the captured image, and provides the generated image signal to the target image memory 102.

The temporal hierarchical structure determination process performed by the temporal hierarchical structure determination unit 103 will be described in detail with reference to the flowchart of FIG. 4. The effects of this determination process will also be described together with the detailed description of the flowchart, using a specific numerical example.

First, in step S401, the temporal hierarchical structure determination unit 103 acquires a recording frame rate of moving image data to be subsequently encoded (hereinafter referred to as "second moving image data"). The recording frame rate of the second moving image data is designated by a user operation using the operation unit 114, for example. Here, the recording frame rate of the second moving image data is given as 120 fps (frame per second).

At step S402, the temporal hierarchical structure determination unit 103 acquires a base frame rate. The base frame rate is also designated by a user operation using the operation unit 114, for example. Here, the base frame rate is a frame rate that is set independently of the recording frame rate and frame rates of previously encoded moving image data, when determining a temporal hierarchical structure of the second moving image data. Although not necessarily a case, the base frame rate is generally a low frame rate and is set for the lowest layer in the temporal hierarchical structure of the second moving image data. By setting the temporal hierarchical structure such that the lowest layer is formed with a predetermined base frame rate, all moving image data to be subsequently encoded has at least one common frame rate (i.e., the base frame rate). Accordingly, editing (e.g., combining) compatibility is guaranteed (i.e., frame rate conversion is unnecessary at the time of editing) by at least the base frame rate. Here, the base frame rate is given as 15 fps.

At step S403, the temporal hierarchical structure determination unit 103 determines whether previously encoded moving image data (hereinafter referred to as "first moving image data") is saved in the storage medium 113. If the first moving image data is saved in the storage medium 113, the temporal hierarchical structure determination unit 103 advances to step S404, and if the first moving image data is not saved, the temporal hierarchical structure determination unit 103 advances to step S407.

Here, description from step S404 onwards will be given assuming that two first moving image data A and B are saved in the storage medium 113 and that these two first moving image data were recorded at frame rates of 30 fps and 60 fps. Note that it is assumed that the first moving image data A is recorded on the storage medium 113 at 30 fps, and has a temporal hierarchical structure including one temporal layer which correspond to 30 fps. Also note that it is assumed that the first moving image data B is recorded on the storage medium 113 at 60 fps, and has a temporal hierarchical structure including two temporal layers which correspond to 60 fps and 30 fps.

At step S404, the temporal hierarchical structure determination unit 103 determines whether frame rates and temporal hierarchical information of all the first moving image data A and B saved in the storage medium 113 have been acquired. If the frame rates and temporal hierarchical information of all the first moving image data A and B have been acquired, the temporal hierarchical structure determination unit 103 advances to step S406, and if the frame rates and temporal hierarchical information thereof have not been acquired, the temporal hierarchical structure determination unit 103 advances to step S405. In the first exemplary embodiment, since two first moving image data A and B are assumed to be stored in the storage medium 113, the process of step S404 and the process of step S405, which is discussed later, are both repeated twice.

At step S405, the temporal hierarchical structure determination unit 103 acquires the frame rates and the temporal hierarchical information of all the first moving image data A and B that is saved in the storage medium 113. In a case where a frame rate is embedded in a file format as moving image information, it is possible for the temporal hierarchical structure determination unit 103 to acquire the frame rate by referring to the file format. It is also possible to acquire a frame rate through computation from num_units_in_tick and time_scale that are included in HRD parameters syntax in a header of encoded moving image data. On the other hand, methods of acquiring temporal hierarchical information include a method that involves discriminating temporal hierarchical information from nuh_temporal_id plus1 included in nal_unit_header Syntax in a header of encoded moving image data. An alternative method involves acquiring temporal hierarchical information from vps_max_sub_layers_minus1 included in VPS (Video Parameter Set) Syntax. A further method involves acquiring temporal hierarchical information from sps_max_sub_layers_minus1 included in SPS (Sequence Parameter Set) Syntax.

At step S406, the temporal hierarchical structure determination unit 103 determines the temporal hierarchical structure of the second moving image data as a temporal hierarchical structure having temporal layers corresponding to the base frame rate and the frame rates of all the first moving image data A and B, and incorporating the temporal hierarchical structures of all the first moving image data A and B. A detailed description will now be given using the numerical example mentioned earlier. The two first moving image data A and B has the following frame rates and temporal hierarchical structures (temporal IDs represent the temporal layer numbers).

First moving image data A
  Frame rate: 30 fps
  Temporal ID=0: 30 fps
First moving image data B
  Frame rate: 60 fps
  Temporal ID=0: 30 fps
  Temporal ID=1: 60 fps In order to provide compatibility with the frame rates of all the first moving image data A and B while providing the second moving image data with the recording frame rate acquired at step S401, a temporal layer of 30 fps, a temporal layer of 60 fps and a temporal layer of 120 fps are required. Also, as aforementioned, a temporal layer having the base frame rate of 15 fps is provided as the lowest layer. Accordingly, the temporal hierarchical structure determination unit 103 determines the temporal hierarchical structure of the second moving image data as follows.

Figure 5:
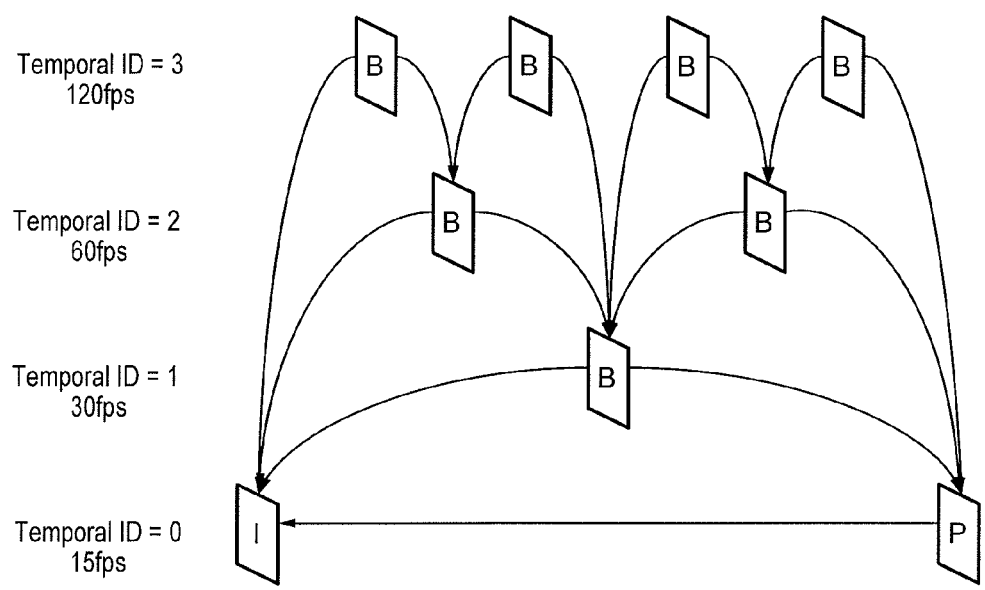
FIG. 5 is a diagram for showing an exemplary temporal hierarchical structure determined in accordance with the temporal hierarchical structure determination process.

Second moving image data
  Frame rate: 120 fps
  Temporal ID=0: 15 fps
  Temporal ID=1: 30 fps
  Temporal ID=2: 60 fps
  Temporal ID=3: 120 fps The temporal hierarchical structure determination unit 103 notifies the determined temporal hierarchical structure to the prediction unit 104. The prediction unit 104 performs predictive coding by restricting a reference relationship between pictures such that each picture does not refer to higher temporal layers, as shown in FIG. 5, based on the notified temporal hierarchical structure. This enables generation of moving image data having compatibility with respect to the frame rates of all the first moving image data A and B, the recording frame rate of the second moving image data, and the designated frame rate (i.e., 15 fps, 30 fps, 60 fps and 120 fps). A feature of temporal hierarchical encoding is that the reference relationship is restricted as described with reference to FIGS. 2 and 5. Accordingly, it becomes possible to reproduce moving images at various frame rates by discarding pictures belonging to all temporal layers from the highest temporal layer to a selected temporal layer (or, by decoding pictures belonging to all temporal layers from the lowest layer and a selected temporal layer).

On the other hand, in a case where, in step S403, first moving image data is not saved in the storage medium 113, the process of step S407 is started. At step S407, the temporal hierarchical structure determination unit 103 determines whether the base frame rate equals the recording frame rate of the second moving image data. If the base frame rate equals the recording frame rate of the second moving image data, the temporal hierarchical structure determination unit 103 advances to step S408, and the temporal hierarchical structure of the second moving image data will be determined as a single temporal hierarchical structure. Also, in a case where the base frame rate equals the recording frame rate of the second moving image data are not equal, the temporal hierarchical structure determination unit 103 advances to step S409, and the temporal hierarchical structure of the second moving image data is determined as a temporal hierarchical structure whose lowest temporal layer corresponds to the base frame rate. In this case, the temporal hierarchical structure of the second moving image data includes two temporal layers consisting of a layer corresponding to the base frame rate and a layer corresponding to the recording frame rate of the second moving image data. Alternatively, the temporal hierarchical structure of the second moving image data may include three or more temporal layers in consideration of compatibility with frame rate of moving image data to be subsequently encoded.

As described above, according to the first exemplary embodiment, the encoding apparatus 100 performs encoding such that the second moving image data (encoding target) to be subsequently encoded includes a temporal hierarchical structure. At this time, the encoding apparatus 100 is configured such that the temporal hierarchical structure of the second moving image data includes temporal layers corresponding to the frame rates of all the first moving image data A and B previously encoded and a temporal layer corresponding to the recording frame rate of the second moving image data.

In a situation where frame rates of the first moving image data and the second moving image data recorded on the storage medium 113 differ, the processing load at the time of combining these moving image data is thereby reduced.

Second Exemplary Embodiment

Figure 4:
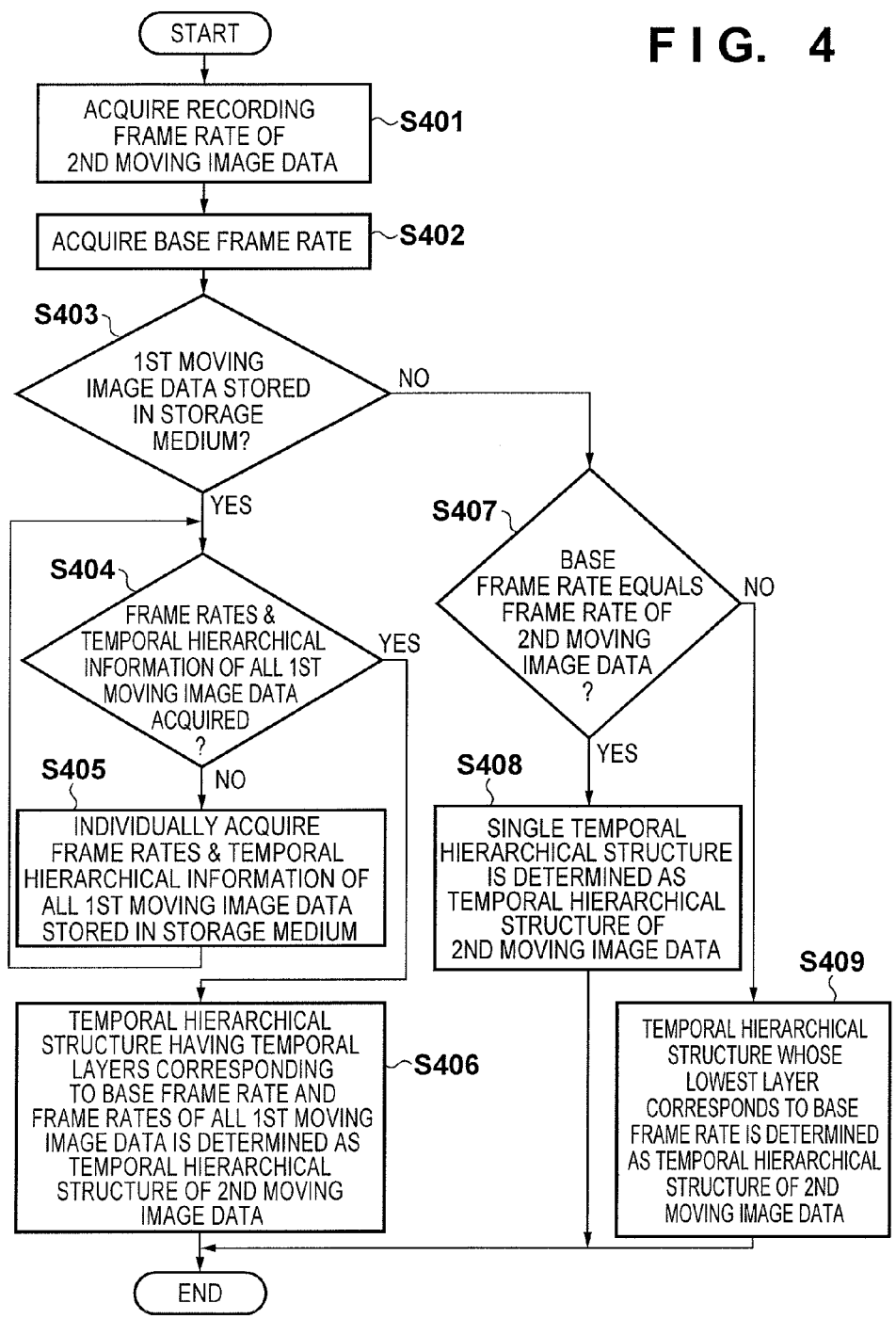
FIG. 4 is a flowchart for showing a temporal hierarchical structure determination process performed by a hierarchical structure determination unit 103 in the first exemplary embodiment.

In the first exemplary embodiment, the frame rate and the temporal hierarchical structure were acquired from each one of first moving image data A and B (see steps S404 and S405 in FIG. 4). In contrast, in the second exemplary embodiment, a configuration that acquires the frame rates and the temporal hierarchical structures of all the first moving image data A and B utilizing "temporal layer compatibility information" will be described.

In the second exemplary embodiment, the basic configuration of the encoding apparatus 100 is similar to the first exemplary embodiment (see FIG. 1). Hereinafter, the description will focus on differences from the first exemplary embodiment.

In the second exemplary embodiment, the encoding apparatus 100 stores temporal layer compatibility information indicating the frame rate and the temporal hierarchical structure of the second moving image data in the storage medium 113, at the time of determining the temporal hierarchical structure of the second moving image data. The encoding apparatus 100 then acquires the frame rates and the temporal hierarchical structures of the first moving image data A and B by referring to the temporal layer compatibility information recorded in the storage medium 113, when temporal hierarchical structure determination is subsequently performed.

Figure 6:
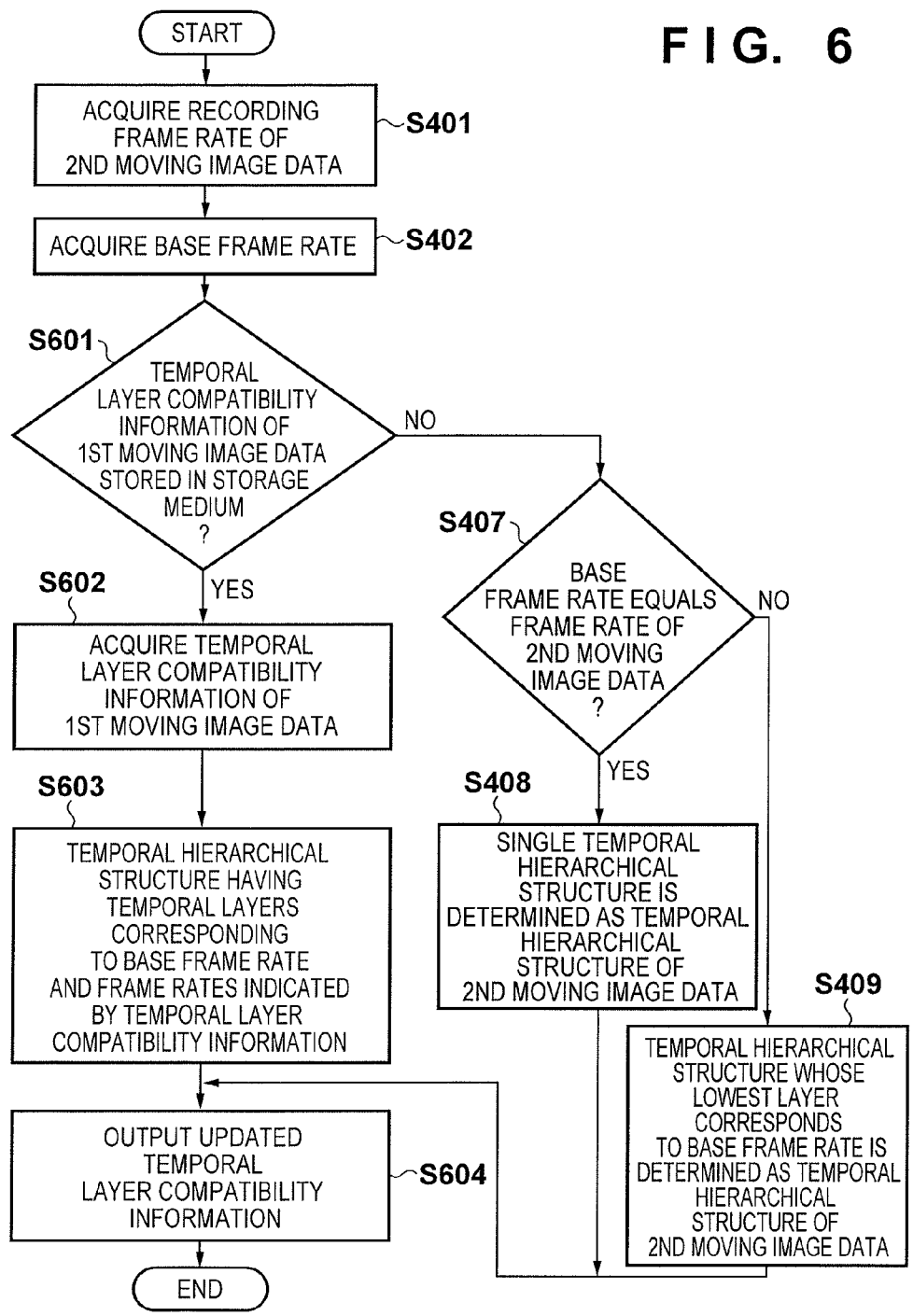
FIG. 6 is a flowchart for showing another temporal hierarchical structure determination process performed by a hierarchical structure determination unit 103 in a second exemplary embodiment.

The temporal hierarchical structure determination process performed by the temporal hierarchical structure determination unit 103 will be described in detail, with reference to the flowchart of FIG. 6. In this flowchart, the same reference signs are given to steps in which process that is the same as or similar to FIG. 4 is performed, and description thereof will be omitted.

At step S601, the temporal hierarchical structure determination unit 103 determines whether temporal layer compatibility information related to all the first moving image data A and B is saved in the storage medium 113. Here, the temporal layer compatibility information is information indicating the frame rates and the temporal hierarchical structures of previously recorded all the first moving image data A and B. The temporal layer compatibility information includes num_layer_minus1 indicating the number of temporal layers and frame_rate_id indicating the frame rate for each temporal layer, as shown in a temporal layer compatibility information syntax of FIG. 7. If temporal layer compatibility information related to all the first moving image data A and B is stored in the storage medium 113, the temporal hierarchical structure determination unit 103 advances to step S602, and if such temporal layer compatibility information is not stored in the storage medium 113, the temporal hierarchical structure determination unit 103 advances to step S407.

At step S602, the temporal hierarchical structure determination unit 103 acquires the temporal layer compatibility information related to all the first moving image data A and B that is stored in the storage medium 113. At step S603, the temporal hierarchical structure determination unit 103 determines the temporal hierarchical structure of the second moving image data as a temporal hierarchical structure having temporal layers corresponding to the base frame rate and the frame rates indicated by the temporal layer compatibility information acquired at step S602, and incorporating the temporal hierarchical structures indicated by the temporal layer compatibility information acquired at step S602. The temporal hierarchical structure of the second moving image data also includes a layer corresponding to the recording frame rate of the second moving image data, similarly to the case of step S406 in FIG. 4. At step S603, the temporal hierarchical structure determination unit 103 updates, based on the determined temporal hierarchical structure of the second moving image data, the temporal layer compatibility information acquired at step S602. At step S604, the temporal hierarchical structure determination unit 103 stores updated temporal layer compatibility information indicating the temporal hierarchical structure determined at step S603 in the storage medium 113.

Here, it is assumed that the recording frame rate of the second moving image data is 120 fps and the base frame rate is 15 fps, and that the frame rates indicated by the temporal layer compatibility information acquired at step S602 includes 30 fps and 60 fps (see left side of FIG. 8). In this case, at step S603, the temporal hierarchical structure of the second moving image data is determined so as to incorporate the temporal hierarchical structure indicated by the temporal layer compatibility information and to have a temporal layer corresponding to the base frame rate. Accordingly, the temporal hierarchical structure of the second moving image data is determined so as to include four layers corresponding to 15 fps, 30 fps, 60 fps, and 120 fps. In this example, the temporal layer compatibility information acquired at step S602 is num_layer_minus1=1, frame_rate_id[0]=30, and frame_rate_id[1]=60, as shown on the left side of FIG. 8. Also, the updated temporal layer compatibility information output at step S604 further includes temporal layers corresponding to 15 fps and 120 fps. Thus, the temporal layer compatibility information will be num_layer_minus1=3, frame_rate_id[0]=15, frame_rate_id[1]=30, frame_rate_id[2]=60, and frame_rate_id[3]=120 (see right side of FIG. 8). The temporal layer compatibility information is updated in this way. Note that encoding process that is based on the temporal hierarchical structure determined at step S603 is similar to the first exemplary embodiment, and the reference relationship between pictures is restricted as described with reference to FIGS. 2 and 5.

As described above, according to the second exemplary embodiment, the encoding apparatus 100 acquires temporal layer compatibility information recorded on the storage medium 113, instead of acquiring the frame rate and the temporal hierarchical structure from each one of first moving image data A and B. A temporal hierarchical structure that is indicated by the temporal layer compatibility information is determined in step S603, so as to have compatibility relating to frame rates with respect to all the first moving image data A and B that was previously encoded and recorded on the storage medium 113. Accordingly, the encoding apparatus 100 is substantively able to acquire the frame rates and the temporal hierarchical structures of all the first moving image data A and B recorded on the storage medium 113, by acquiring the temporal layer compatibility information.

Particularly in a case where a plurality of first moving image data are recorded on the storage medium 113, the processing load pertaining to acquisition of the frame rates and the temporal hierarchical structures of the plurality of the first moving image data can thereby be reduced.

Other Exemplary Embodiments

The above-described exemplary embodiments can also be realized by a computer of a system or apparatus that reads out and executes a program stored in a storage medium (e.g., non-transitory computer-readable storage medium). The computer may comprise one or more of a central processing unit (CPU), micro processing unit (MPU), or other circuitry, and may include a network of separate computers or separate computer processors. The program may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention is described with reference to exemplary embodiments, it is to be understood that the present invention is not limited to the exemplary embodiments. The scope of the following claims is to be accorded the broadest interpretation so as to encompass all modifications and equivalent structures.

This application claims the benefit of Japanese Patent Application No. 2013-097116, filed on May 2, 2013, which is hereby incorporated by reference herein in its entirety.

What is claimed is:

1. An encoding apparatus comprising:
an encoding unit that encodes moving image data so that it has a temporal hierarchical structure in which a frame rate in a case of decoding up to a layer that is one above a predetermined layer is higher than a frame rate in a case of decoding up to the predetermined layer; and
a processor that:
acquires a frame rate of encoded first moving image data; and
acquires second moving image data targeted for encoding and a recording frame rate that is designated by a user operation,
wherein the encoding unit encodes the second moving image data so that it has a temporal hierarchical structure including a layer corresponding to the frame rate of the first moving image data and a layer corresponding to the recording frame rate.

2. The encoding apparatus according to claim 1, wherein in a case where the first moving image data has a temporal hierarchical structure, the processor acquires the temporal hierarchical structure of the first moving image data, and the encoding unit encodes the second moving image data so that it has a temporal hierarchical structure including layers of the temporal hierarchical structure of the first moving image data and a layer corresponding to the recording frame rate.

3. The encoding apparatus according to claim 1, wherein the processor acquires, from a storage medium on which is recorded a plurality of encoded moving image data including the first moving image data, the frame rate of each of the plurality of encoded moving image data, the encoding unit encodes the second moving image data so that it has a temporal hierarchical structure including layers corresponding to the frame rate of each of the plurality of encoded moving image data and a layer corresponding to the recording frame rate, and the processor records the second moving image data encoded by the encoding unit to the storage medium.

4. The encoding apparatus according to claim 3, wherein the processor records, to the storage medium, temporal layer compatibility information indicating the temporal hierarchical structure of the second moving image data encoded by the encoding unit, the processor acquires the temporal layer compatibility information, instead of the frame rate of each of the plurality of encoded moving image data, and the encoding unit encodes the second moving image data so that it has a temporal hierarchical structure including layers of the temporal hierarchical structure indicated by the temporal layer compatibility information and a layer corresponding to the recording frame rate.

5. The encoding apparatus according to claim 1, wherein the encoding unit encodes the second moving image data so that it has a temporal hierarchical structure further including a layer corresponding to a predetermined base frame rate.

6. The encoding apparatus according to claim 5, wherein the encoding unit encodes the second moving image data such that the temporal hierarchical structure of the second moving image data includes a layer corresponding to the base frame rate as a lowest layer.

7. The encoding apparatus according to claim 1, wherein the encoding unit encodes moving image data such that:

when a portion, of encoded moving image data, corresponding to a lowest layer is decoded, frames constituting a moving image having a frame rate corresponding to the lowest layer are obtained, and when a portion, of the encoded moving image data, corresponding to a predetermined layer is decoded, frames that are not obtained by decoding a portion, of the encoded moving image data, corresponding to each layer that is lower than the predetermined layer are obtained, among frames constituting a moving image having a frame rate corresponding to the predetermined layer.

8. The encoding apparatus according to claim 1, wherein the encoding apparatus includes an image capture apparatus.

9. A method comprising:

encoding moving image data so that it has a temporal hierarchical structure in which a frame rate in a case of decoding up to a layer that is one above a predetermined layer is higher than a frame rate in a case of decoding up to the predetermined layer;

acquiring a frame rate of encoded first moving image data;

acquiring second moving image data targeted for encoding and a recording frame rate that is designated by a user operation; and encoding the second moving image data so that it has a temporal hierarchical structure including a layer corresponding to the frame rate of the first moving image data and a layer corresponding to the recording frame rate.

10. A non-transitory computer-readable storage medium that stores a program for causing a computer to execute a method, the method comprising:

encoding moving image data so that it has a temporal hierarchical structure in which a frame rate in a case of decoding up to a layer that is one above a predetermined layer is higher than a frame rate in a case of decoding up to the predetermined layer;

acquiring a frame rate of encoded first moving image data;

acquiring second moving image data targeted for encoding and a recording frame rate that is designated by a user operation; and encoding the second moving image data so that it has a temporal hierarchical structure including a layer corresponding to the frame rate of the first moving image data and a layer corresponding to the recording frame rate.

* * * * *